United States Patent
Tsugane et al.

(10) Patent No.: US 6,852,035 B2
(45) Date of Patent: Feb. 8, 2005

(54) WELDING BELLOWS CAPABLE OF ABSORBING TORSION

(76) Inventors: Yoichi Tsugane, c/o Mirapro Co., Ltd. 1100 Anadaira, Sutama-cho, Kitakoma-gun, Yamanashi 408-0111 (JP); Takashi Mishiba, c/o Mirapro Co., Ltd. 1100 Anadaira, Sutama-cho, Kitakoma-gun, Yamanashi 408-0111 (JP); Yusuke Suetsugu, c/o Mirapro Co., Ltd. 1100 Anadaira, Sutama-cho, Kitakoma-gun, Yamanashi 408-0111 (JP); Hiroyuki Tsugane, c/o Mirapro Co., Ltd. 1100 Anadaira, Sutama-cho, Kitakoma-gun, Yamanashi 408-0111 (JP)

( * ) Notice: Subject to any disclaimer, the term of this patent is extended or adjusted under 35 U.S.C. 154(b) by 0 days.

(21) Appl. No.: 10/255,634

(22) Filed: Sep. 27, 2002

(65) Prior Publication Data

US 2004/0063505 A1 Apr. 1, 2004

(30) Foreign Application Priority Data

Sep. 27, 2002 (JP) .................................. 2001-295737

(51) Int. Cl.[7] .............................................. F16D 3/79
(52) U.S. Cl. ........................................... 464/79; 92/45
(58) Field of Search .......................... 464/79, 80, 99, 464/174, 175; 285/226; 267/154; 92/34, 35, 45; 138/121, 122

(56) References Cited

U.S. PATENT DOCUMENTS

| | | | | |
|---|---|---|---|---|
| 514,257 A | * | 2/1894 | Bristol | 92/45 |
| 1,580,479 A | * | 4/1926 | Frankenfield | 92/45 X |
| 1,997,565 A | * | 4/1935 | Arbuckle | 285/226 X |
| 2,100,835 A | * | 11/1937 | Ugo | 285/226 X |
| 2,848,882 A | * | 8/1958 | Larsen et al. | 464/79 X |
| 3,802,322 A | * | 4/1974 | Johnson et al. | 92/34 X |
| 4,125,130 A | | 11/1978 | Yamamoto | |
| 4,579,045 A | * | 4/1986 | Tominaga | 92/45 X |
| 5,397,157 A | | 3/1995 | Hempel et al. | |
| 5,799,699 A | * | 9/1998 | Chiang | 138/121 |
| 6,098,663 A | | 8/2000 | Larsen | |
| 2002/0088500 A1 | * | 7/2002 | Turner et al. | 138/122 |

FOREIGN PATENT DOCUMENTS

| | | |
|---|---|---|
| JP | 52-072052 | 6/1977 |
| JP | 55-33505 | 9/1980 |
| JP | 62-118163 | 5/1987 |
| JP | 5-67835 | 9/1993 |

\* cited by examiner

Primary Examiner—Greg Binda
(74) Attorney, Agent, or Firm—Wenderoth, Lind & Ponack, L.L.P.

(57) ABSTRACT

A welding bellows capable of absorbing torsion is equipped with a bellows core made from thin metal plates wherein the centers of the inner diameter and the outer diameter are made eccentric to each other. The metal plates are combined so as to make it possible to absorb torsion with respect to the center axis.

9 Claims, 8 Drawing Sheets

WELDING BELLOWS CAPABLE OF ABSORBING TORSION

BACKGROUND OF THE INVENTION

1. Field of the Invention

The present invention is related to a welding bellows capable of absorbing torsion, and in particular to a welding bellows which can absorb torsional displacement with respect to the center axis while maintaining sealability.

2. Description of the Prior Art

Prior art welding bellows have a wave-shaped cross section in the axial direction, wherein the inner diameter and the outer diameter have the same axis so that the wave shape is repeated in a multistage manner. These prior art bellows can absorb expansion and contraction displacement in the axial direction and displacement due to bending, but they can not absorb torsional displacement.

Further, Japanese Laid-Open Patent Publication No. HEI 5-67835 proposes a torsion bellows having a prescribed incline with respect to the center axis of the bellows and a ridgeline shape with continuous alternating peaks and valleys in the axial direction between both ends. However, this torsion bellows can not absorb expansion and contraction displacement in the axial direction and displacement due to bending.

First with respect to ultrahigh vacuum devices, there is a surprisingly high demand to absorb torsional angular displacement with respect to the center axis while maintaining sealability.

SUMMARY OF THE INVENTION

In response to the demand mentioned above, it is an object of present invention to provide a welding bellows capable of absorbing torsion. Namely, in contrast with the prior art welding bellows in which a uniform expansion and contraction displacement is applied over each peak and the complete revolution in the circumferential direction, in the welding bellows capable of absorbing torsion of the present invention, by making the centers of the inner diameter and the outer diameter relatively eccentric to change each expansion and contraction displacement in the circumferential direction, because the torsion component in the rotational direction can be removed, even though there is a minute amount of torsion for one peak, by spreading this over the plurality of peaks, it is possible to practically secure a required amount of torsional displacement.

Furthermore, because the span is displaced continuously and the amount of expansion and contraction in a complete revolution can be induced to change easily, when there is a relatively small torque, this torsional displacement can be absorbed, and compared with the type of welding bellows in which three prior art bellows are combined to absorb torsion, this invention is achieved by one compact bellows, and in the same way as the prior art welding bellows, it is possible to plan a long use life.

Further, in addition to absorbing torsional displacement in the rotational direction, because the welding bellows according to this invention can also absorb expansion and contraction displacement and bending displacement at the same time in the same way as the prior art welding bellows, the present invention achieves excellent results and can be applied to a wide range of applications.

In order to achieve the object stated above, the welding bellows capable of absorbing torsion according to the present invention is equipped with a plurality of bellows cores made from thin metal plates wherein the centers of the inner diameter and the outer diameter are made eccentric to each other, and the metal cores are combined so as to make it possible to absorb torsion with respect to the center axis.

In another embodiment of the present invention, the welding bellows capable of absorbing torsion is equipped with a plurality of bellows cores made from thin metal plates wherein the centers of the inner diameter and the outer diameter are made eccentric to each other, and the metal cores are combined so as to make it possible to absorb torsion with respect to the center axis; end flanges provided on both ends of the welding bellows; and at least one middle flange arranged between the end flanges; wherein the plurality of bellows cores are arranged so that the eccentric position of one bellows core forms the same rotational angular position with respect to the eccentric position of the next bellows core so as to make it possible to absorb torsion.

In another embodiment of the present invention, the welding bellows capable of absorbing torsion is equipped with a bellows core made from a thin metal plate, and end flanges provided on both ends of the welding bellows, wherein the centers of the inner diameter and the outer diameter are made eccentric to each other at each peak, and a prescribed number of peaks are provided with the same angular spacing in the circumferential direction so as to form one revolution. For example, one revolution is formed by 36 peaks when the angular spacing is 10°, by 24 peaks when the angular spacing is 15°, and by 18 peaks when the angular spacing is 20°. When necessary, the welding bellows can be made to absorb two or three times the torsion angle with respect to the center axis by doubling or tripling the number of peaks to form two or three revolutions.

In contrast with the prior art welding bellows in which a uniform expansion and contraction displacement is applied over each peak and the complete revolution in the circumferential direction, in the welding bellows capable of absorbing torsion of the present invention, by making the centers of the inner diameter and the outer diameter relatively eccentric to change each expansion and contraction displacement in the circumferential direction, because the torsion component in the rotational direction can be removed, even though there is a minute amount of torsion for one peak, by spreading this over the plurality of peaks, it is possible to practically secure a required amount of torsional displacement.

Furthermore, because the span is displaced continuously and the amount of expansion and contraction in a complete revolution can be induced to change easily, when there is a relatively small torque, this torsional displacement can be absorbed, and compared with the type of welding bellows in which three prior art bellows are combined to absorb torsion, this invention is achieved by one compact bellows, and in the same way as the prior art welding bellows, it is possible to plan a long use life.

Further, in addition to absorbing torsional displacement in the rotational direction, because the welding bellows according to this invention can also absorb expansion and contraction displacement and bending displacement at the same time in the same way as the prior art welding bellows, the present invention achieves excellent results and can be applied to a wide range of applications.

DETAILED DESCRIPTION OF THE PREFERRED EMBODIMENTS

The preferred embodiments of a welding bellows capable of absorbing torsion according to the present invention are described in detail below with reference to the drawings.

Figure 1:
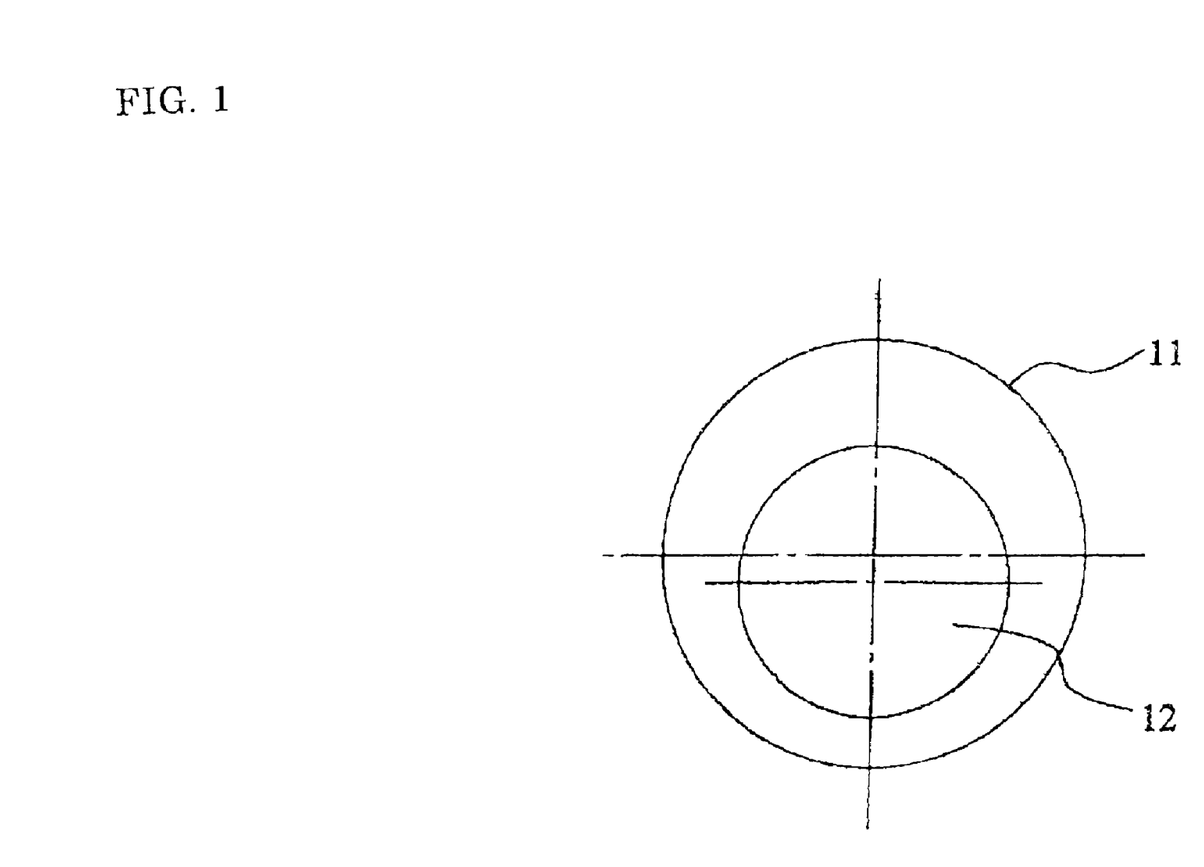
FIG. 1 is a front view showing an eccentric state of metal bellows used in a welding bellows.

In FIG. 1 which is a front view showing an eccentric state of metal bellows used in a welding bellows capable of absorbing torsion according to the present invention, a metal bellows (or bellows core) 11 has a circular profile and is provided with an opening 12 having a center (an inner center) positioned at a position away from the center axis (or outer center) of the circular profile. This center position of the opening 12 of the metal bellows 11 is positioned appropriately in accordance with the required torsional displacement, the size ratio of the profile of the metal bellows 11 and the opening 12, and the like.

The length of the metal bellows 11 can be established appropriately by taking into consideration the length between flanges, the amount of required rotational displacement and angular displacement, the range of expansion and contraction, and the like. Further, the diameter of the metal bellows 11 can be determined automatically from the viewpoint of securing a position for connecting a cylindrical portion. The metal bellows is made up of a plurality of thin metal plates, one of which is seen in plan in FIG. 1.

FIGS. 2(a) and 2(b) through 4(a) and 4(b) are drawings for describing the method of using the metal bellows shown in FIG. 1.

Figure 2A:
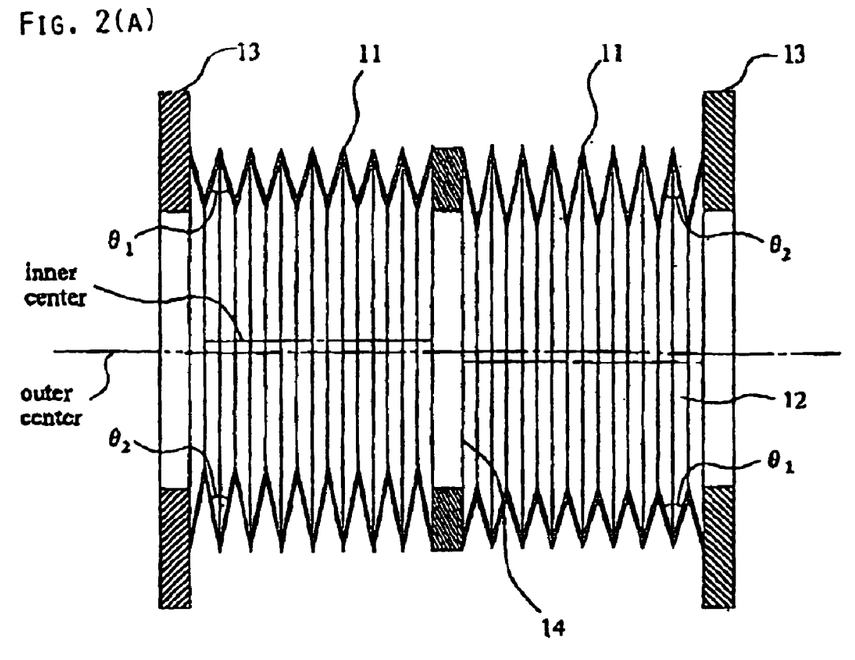
FIG. 2(a) is a side view showing a structure in which a pair of eccentric metal bellows are connected by a flange.
Figure 2B:
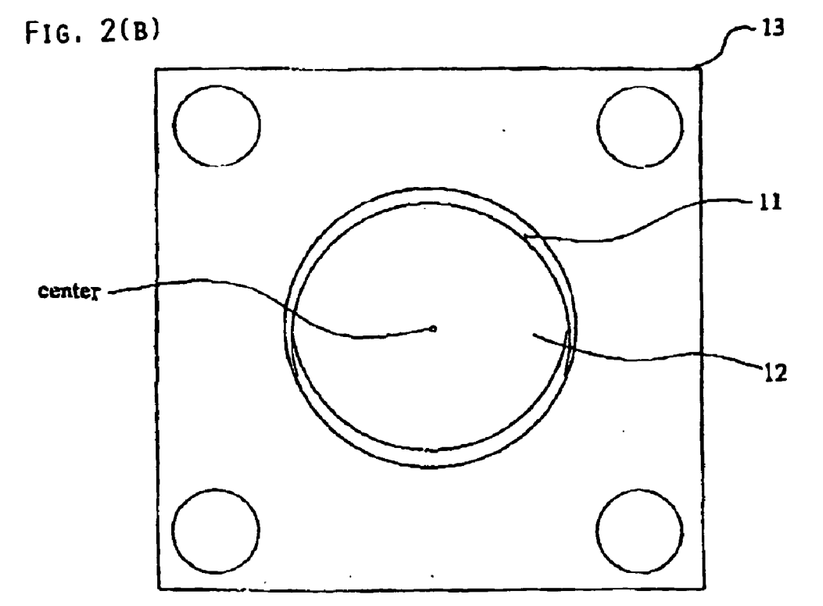
FIG. 2(b) is a front view thereof.

FIGS. 2(a) and 2(b) show an example in which a welding bellows is constructed by connecting a pair of metal bellows 11, wherein a flange 13 is mounted to the outside end portion of each metal bellows 11. Further, the pair of metal bellows 11 are connected to each other via a middle flange 14 which is connected to the inside end portions of each metal bellows 11. Further, in each of the pair of metal bellows 11, the center of the opening 12 at the position away from the center axis of the circular profile is arranged at a symmetrical position with respect to the center axis of the circular profile.

Figure 3A:
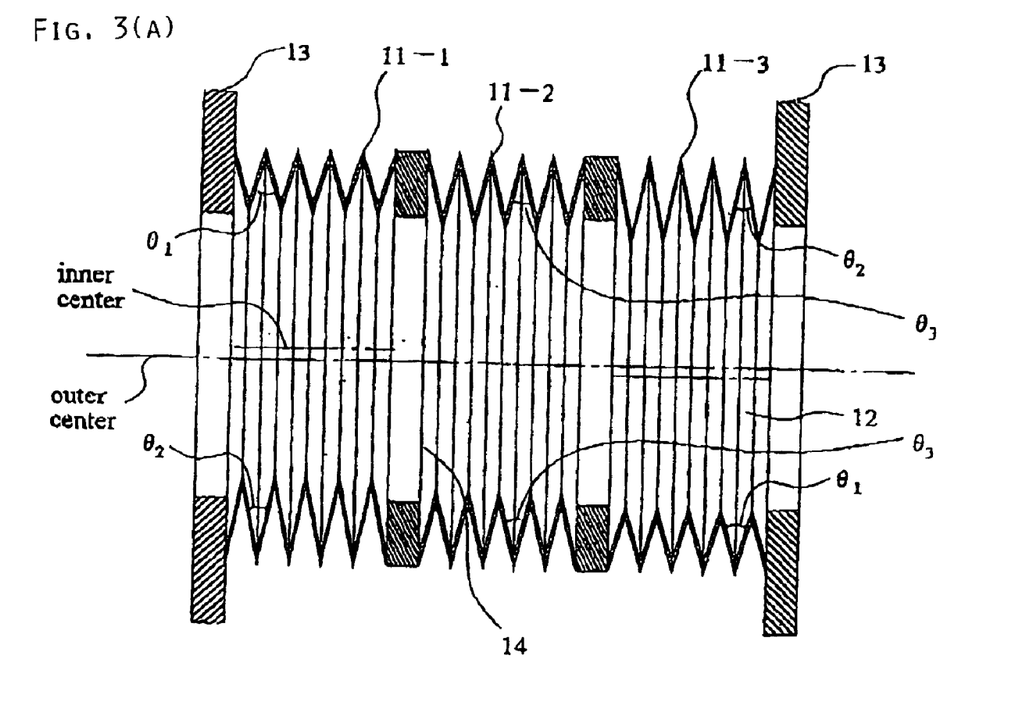
FIG. 3(a) is a side view showing a structure in which three eccentric metal bellows are connected by flanges.
Figure 3B:
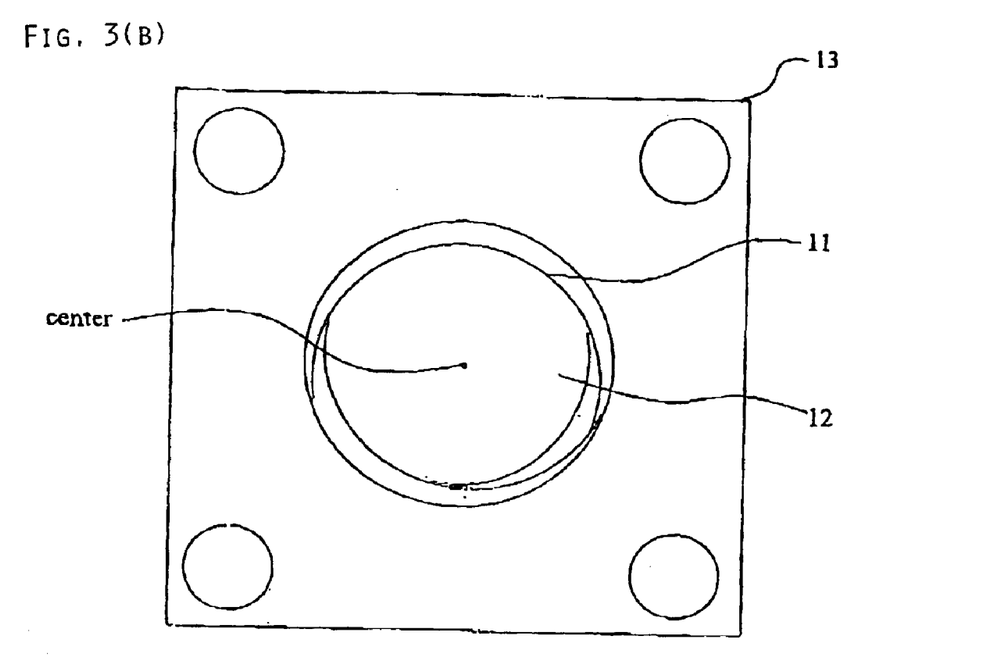
FIG. 3(b) is a front view thereof.

FIGS. 3(a) and 3(b) show an example in which a welding bellows is constructed by connecting three metal bellows 11, wherein a flange 13 is mounted to the outside end portion of each of a side metal bellows 11-1. Further, a middle metal bellows 11-2 is connected to the side metal bellows 11-1 via middle flange 14. A second side metal bellows 11-3 is connected by another flange to middle metal bellows 11-2.

Further, in the side metal bellows 11-1 and 11-3, the center (inner center) of the openings 12, at a position away from the center axis of the circular profile, are arranged at a symmetrical position with respect to the center axis (outer center) of the circular profile, and in the middle metal bellows 11-2, the center of the opening 12 is arranged orthogonal thereto, i.e. the inner and outer centers coincide.

Figure 4A:
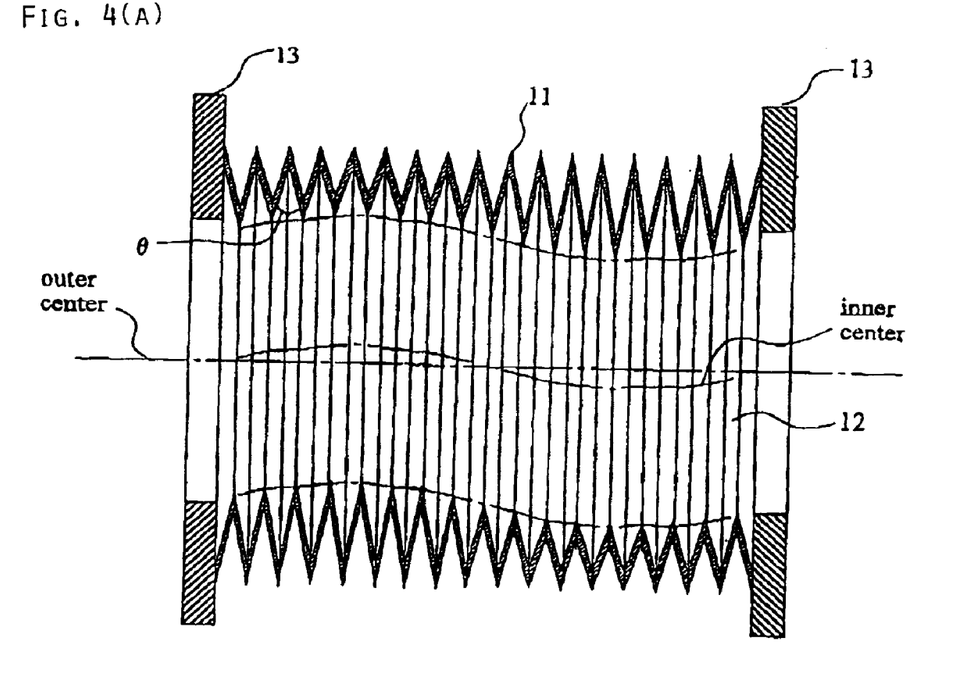
FIG. 4(a) is a side view showing a structure in which a pair of eccentric metal bellows are connected without a flange.
Figure 4B:
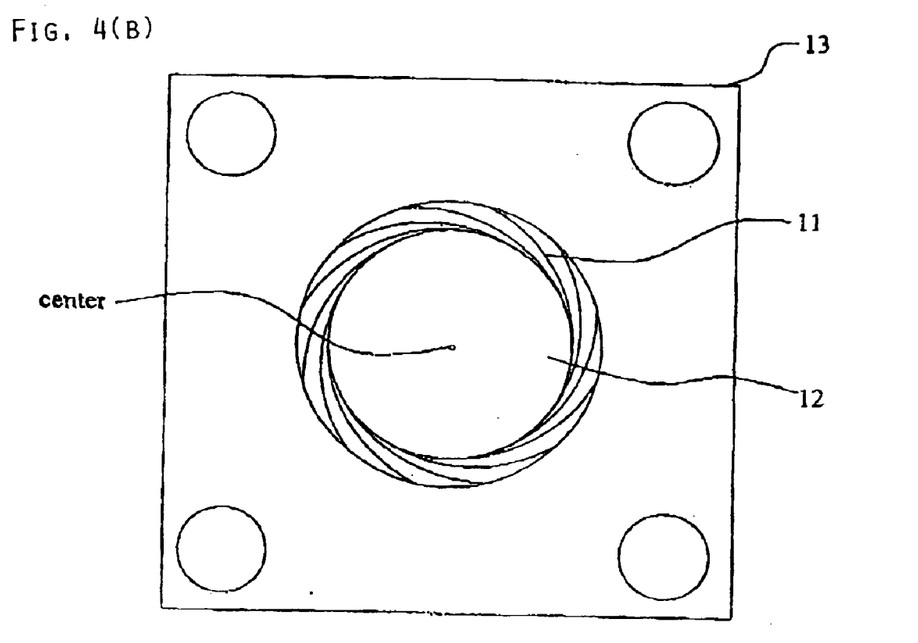
FIG. 4(b) is a front view thereof.

FIGS. 4(a) and 4(b) show an example in which a welding bellows is constructed from a single metal bellows 11, wherein a flange 13 is mounted to the outside end portions of the metal bellows 11. Further, in this metal bellows 11, the center of the opening 12 (inner center) at the position away from the center axis of the circular profile is arranged at peripheral positions with respect to the center axis (outer center) of the circular profile so that the rotation angle thereof changes slowly. Namely, this rotation angle rotates 360 degrees between one end and the other end.

Namely, by making the centers of the inner diameter and the outer diameter eccentric at each peak with the same spacing in the circumferential direction, one revolution is formed in the metal bellows 11 between both end flanges 13. For example, one revolution is formed by 36 peaks when the angle in the circumferential direction is given a 10° spacing, by 24 peaks when the spacing is 15°, and by 18 peaks when the spacing is 20°. Of course, when necessary, the welding bellows can be made to absorb two or three times the torsion angle with respect to the center axis by doubling or tripling the number of peaks to form two or three revolutions.

Figure 5:
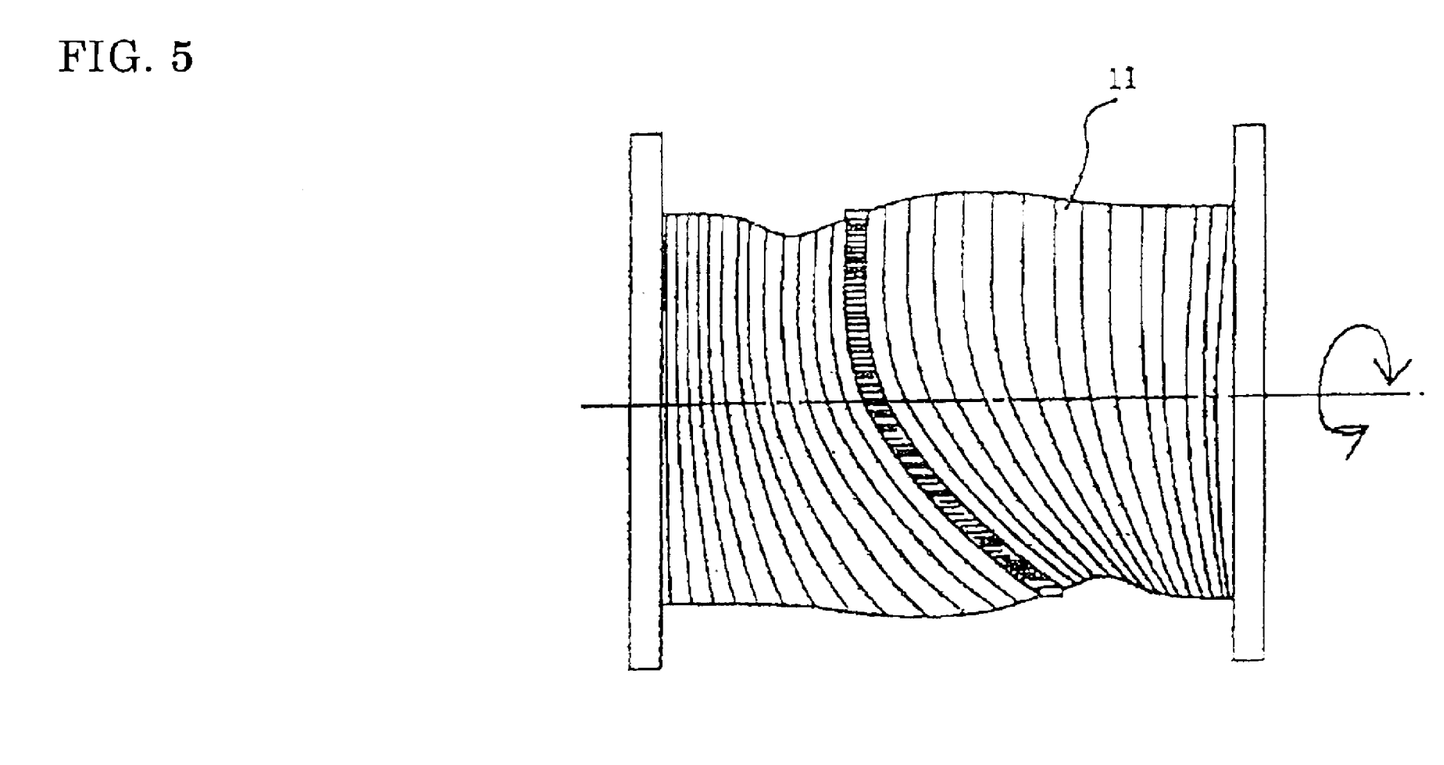
FIG. 5 is a side view showing the state in which torsion is applied to the welding bellows shown in FIG. 2.
Figure 6:
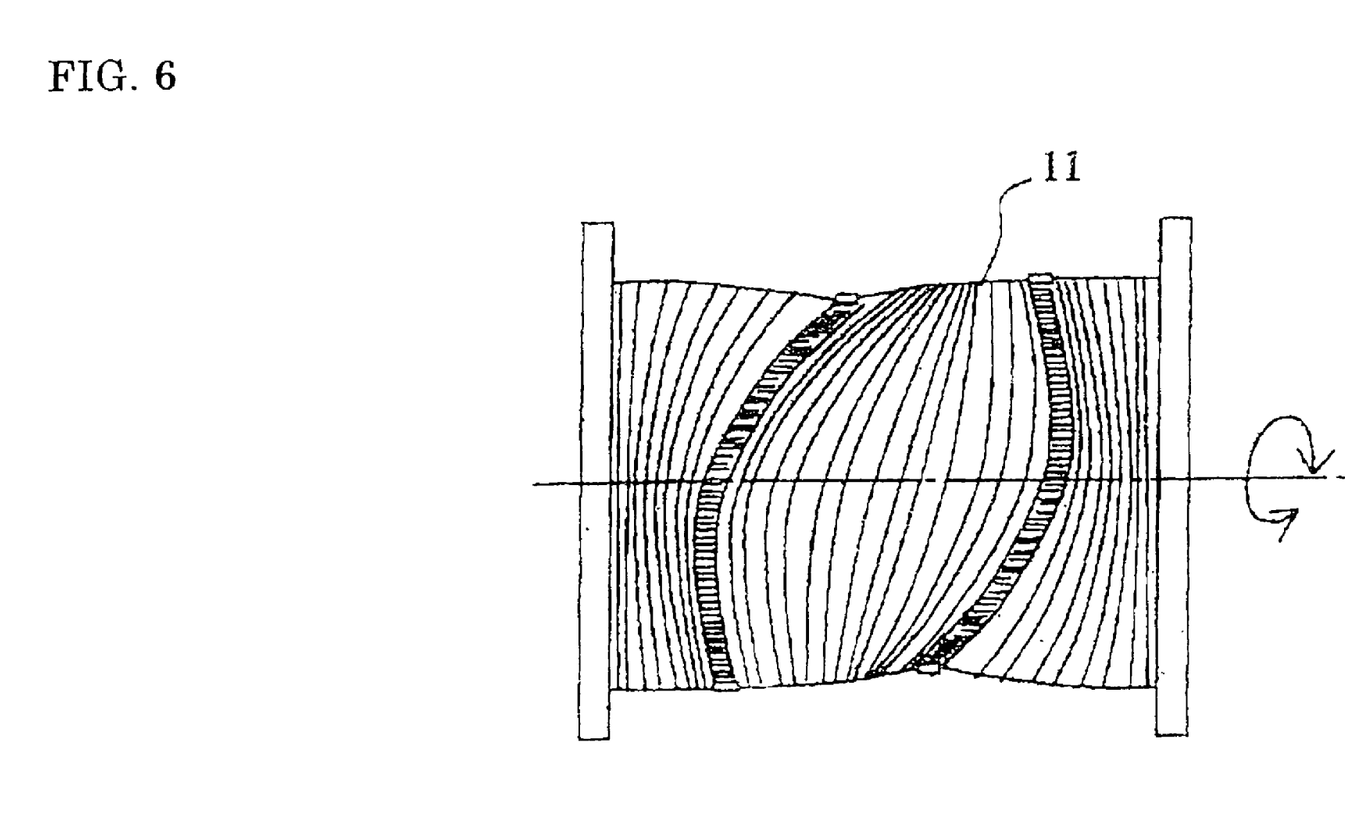
FIG. 6 is a side view showing the state in which torsion is applied to the welding bellows shown in FIG. 3.
Figure 7:
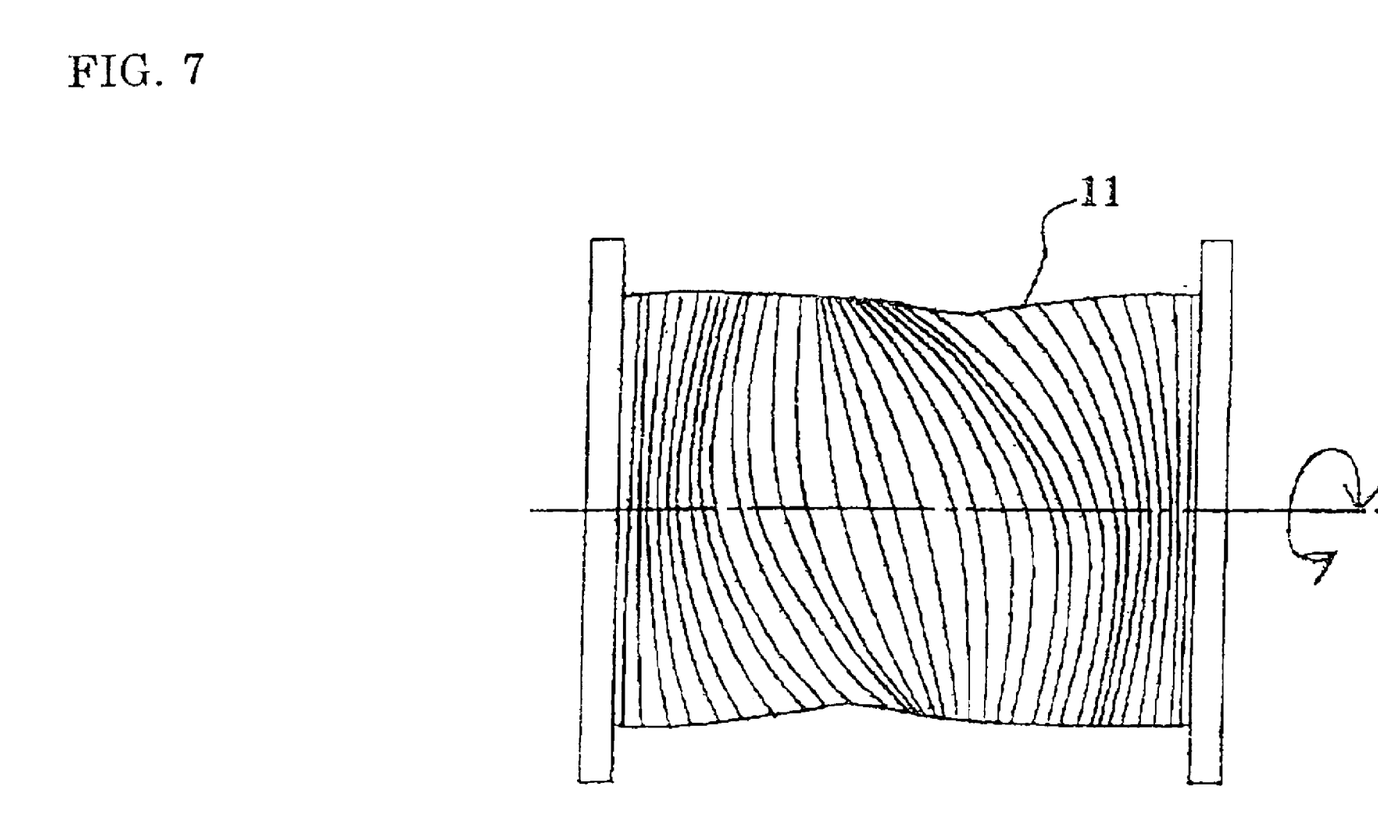
FIG. 7 is a side view showing the state in which torsion is applied to the welding bellows shown in FIG. 4.
Figure 8:
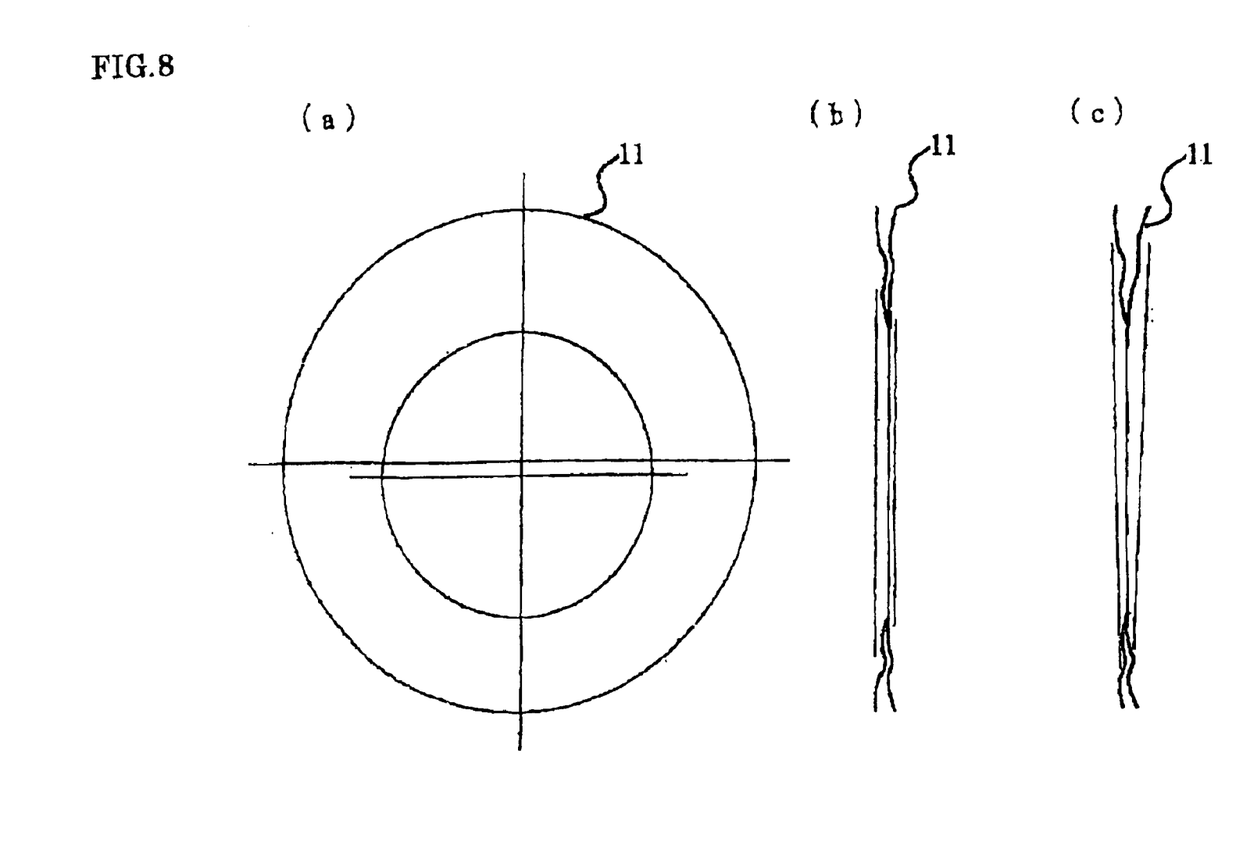
FIG. 8(a) is a front view showing a pair of bellows cores.
FIG. 8(b) is a cross-sectional end view before torsional deformation.
FIG. 8(c) is a cross-sectional end view at the time of torsional displacement.

When the welding bellows shown in FIG. 2, FIG. 3 and FIG. 4 are twisted, the metal bellows 11 thereof are deformed as respectively shown in FIG. 5, FIG. 6 and FIG. 7, and the torsion thereof is absorbed. Namely, in the metal bellows 11 shown in the front view of FIG. 8(a), compared with the uniform spacing in a complete revolution for the state before torsional displacement shown in FIG. 8(b), when torsional displacement occurs, the spacing in the rotation angle becomes narrow at the bottom portion and wide at the top portion as shown in FIG. 8(c).

Thus, as can been seen from the various drawing figures, and particularly drawings FIGS. 2–4, bellows cores 11 or 11-1–11-3 are made up of thin metal plates which together form peak and valley portions, the peaks being the portion facing toward the center axis (identified as the outer center in the drawing figures). The valleys are identified by $\theta_1$–$\theta_3$, or simply $\theta$ with respect to FIGS. 3 and 4. In FIG. 2 or 3 the angular position of eccentricity about the center axis of the inner center of the bellows course 11 or 11-1 and 11-3 are positioned opposite to each other, as can be seen by the identification of the inner center shown in the drawing figures. In the embodiment of FIG. 4, an angular position of eccentricity about the center axis of the inner center of the metal plates changes along the center axis so as to a defined number of peaks that are formed by the metal plates are provided with a common angular spacing about the center axis. This can for example be seen from the identification of the inner center and outer center in FIG. 4(a), and from the end view shown in FIG. 4(b).

As described above, in the embodiments shown in FIG. 2 and FIG. 3, a combination of metal bellows 11 having centers at eccentric positions are used, and because these metal bellows having centers at eccentric positions can be easily mass produced, a welding bellows capable of absorbing torsion can be manufactured at low cost.

Further, in the embodiment shown in FIG. 4, because the center, of the opening 12 of the metal bellows 11 for the thin metal plates thereof is arranged at peripheral positions with respect to the outer center, so that the rotation angle thereof changes slowly, the change in spacing that arises when the metal bellows is displaced can be absorbed in an orderly manner without excessive force, and this makes it possible to provide a welding bellows capable of absorbing torsion having a smooth displacement.

In contrast with the prior art welding bellows, in which a uniform expansion and contraction displacement is applied over each peak and a complete revolution in the circumferential direction, in the welding bellows capable of absorbing torsion of the present invention, by making the centers of the inner diameter and the outer diameter relatively eccentric to change each expansion and contraction displacement in the circumferential direction, because the torsion component in the rotational direction can be removed, even though there is a minute amount of torsion for one peak, by spreading this over a plurality of peaks, it is possible to practically secure a required amount of torsional displacement.

Furthermore, because the span is displaced continuously and the amount of expansion and contraction in a complete revolution can be induced to change easily, when there is a relatively small torque, this torsional displacement can be absorbed. Compared with the type of welding bellows in which three prior art bellows are combined to absorb torsion, the invention is achieved by one compact bellows, and in the same way as the prior art welding bellows, it is possible to plan a long use life.

Further, in addition to absorbing torsional displacement in the rotational direction, because the welding bellows according to this invention can also absorb expansion and contraction displacement and bending displacement at the same time in the same way as the prior art welding bellows, the present invention achieves excellent results and can be applied to a wide range of applications.

What is claimed is:

1. A welding bellows capable of absorbing torsion, comprising:

at least one bellows core having a center axis, said at least one bellows core being made from metal plates;

wherein said metal plates each have a center, hereinafter referred to as an outer center, on said center axis;

wherein said metal plates each have an opening having a center, hereinafter referred to as an inner center;

wherein said inner center of at least some of said metal plates of said at least one bellows core is eccentric to said center axis;

wherein an angular position of eccentricity about said center axis of said inner center of said at least some of said metal plates is different at different positions along said center axis; and wherein said metal plates are combined so as to make it possible to absorb torsion with respect to said center axis.

2. The welding bellows of claim 1, wherein:

said at least one bellows core comprises two bellows cores;

end flanges are provided on an end of each of said two bellows cores; and at least one middle flange is arranged between said end flanges and said two bellows cores;

wherein said angular position of eccentricity about said center axis of said inner center of said metal plates of one of said two bellows cores is opposite to that of the other of said two bellows cores.

3. The welding bellows of claim 2, wherein:

said at least one bellows core further comprises a third bellows core positioned between said two bellows cores;

said at least one middle flange comprises two middle flanges positioned on opposite ends of said third bellows core; and said inner center of said metal plates of said third bellows core are on said center axis.

4. The welding bellows of claim 1, wherein:

end flanges are provided on ends of said at least one bellows core; and wherein said angular position of eccentricity about said center axis of said inner center of said metal plates of said at least one bellows core changes along said center axis such that a defined number of peaks formed by said metal plates are provided with a common angular spacing about said center axis.

5. The welding bellows of claim 4, wherein said common angular spacing is 10° such that 36 peaks formed by said metal plates result in one revolution about said center axis.

6. The welding bellows of claim 4, wherein said common angular spacing is 15° such that 24 peaks formed by said metal plates result in one revolution about said center axis.

7. The welding bellows of claim 4, wherein said common angular spacing is 20° such that 18 peaks formed by said metal plates result in one revolution about said center axis.

8. The welding bellows of claim 4, wherein said metal plates of said at least one bellows core are provided in sufficient amount such that the number of peaks formed by said metal plates, having said common angular spacing, result in at least two revolutions about said center axis.

9. The welding bellows of claim 4, wherein said metal plates of said at least one bellows core are provided in sufficient amount such that the number of peaks formed by said metal plates, having said common angular spacing, result in three revolutions about said center axis.

* * * * *